United States Patent
Dix et al.

(10) Patent No.: US 12,546,240 B2
(45) Date of Patent: Feb. 10, 2026

(54) LUBRICANT PAN AND INTERNAL COMBUSTION ENGINE FOR A VEHICLE

(71) Applicant: Bayerische Motoren Werke Aktiengesellschaft, Munich (DE)

(72) Inventors: Markus Dix, Landshut (DE); Oleg Konrad, Hohenthann Weihenstephan (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 17/775,765

(22) PCT Filed: Oct. 12, 2020

(86) PCT No.: PCT/EP2020/078558
§ 371 (c)(1),
(2) Date: May 10, 2022

(87) PCT Pub. No.: WO2021/094044
PCT Pub. Date: May 20, 2021

(65) Prior Publication Data
US 2022/0381167 A1 Dec. 1, 2022

(30) Foreign Application Priority Data
Nov. 11, 2019 (DE) ...................... 10 2019 130 291.9

(51) Int. Cl.
*F01M 11/00* (2006.01)
*F01M 5/00* (2006.01)
(Continued)

(52) U.S. Cl.
CPC ........ *F01M 11/0004* (2013.01); *F01M 5/001* (2013.01); *F01M 5/002* (2013.01);
(Continued)

(58) Field of Classification Search
CPC .... F01M 5/002; F01M 5/007; F01M 11/0004; F01M 2011/0025; F01M 2011/0066; F01M 2005/023; F01P 11/08; F28D 15/00
See application file for complete search history.

(56) References Cited

U.S. PATENT DOCUMENTS 1,989,585 A * 1/1935 Bigelow ................ F01M 5/007
184/104.1
3,613,778 A * 10/1971 Feldman, Jr. ............ B64G 1/58
29/890.032
(Continued)

FOREIGN PATENT DOCUMENTS

| CN | 106795786 A | 5/2017 |
|----|-------------|--------|
| DE | 30 02 098 A1 | 7/1981 |

(Continued)

OTHER PUBLICATIONS

PCT/EP2020/078558, International Search Report dated Jan. 19, 2021 (Two (2) pages).

(Continued)

*Primary Examiner* — Minh Truong
(74) *Attorney, Agent, or Firm* — Crowell & Moring LLP

(57) ABSTRACT

A lubricant pan for a vehicle includes a receiving region in which a lubricant is at least temporarily receivable, a first wall element, and a second wall element. A temperature-control channel is disposed between the first wall element and the second wall element and a temperature-control medium is flowable through the temperature-control channel. A core that is porous and permeable to the temperature-control medium is disposed in the temperature-control channel between the first wall element and the second wall element. The temperature-control medium is introducible into the temperature-control channel via a first connector (Continued)

and the temperature-control medium is dischargable from the temperature-control channel via a second connector.

10 Claims, 2 Drawing Sheets

(51) Int. Cl.
*F01M 5/02* (2006.01)
*F28D 15/00* (2006.01)
*F28F 13/00* (2006.01)

(52) U.S. Cl.
CPC .............. *F28D 15/00* (2013.01); *F28F 13/00* (2013.01); *F01M 2005/023* (2013.01); *F01M 2011/0025* (2013.01); *F01M 2011/0066* (2013.01)

(56) References Cited

U.S. PATENT DOCUMENTS

| | | | | |
|---|---|---|---|---|
| 3,749,159 | A | * | 7/1973 | Meijer .................. F28D 15/046 |
| | | | | 165/104.26 |
| 4,274,479 | A | * | 6/1981 | Eastman .............. F28D 15/046 |
| | | | | 29/890.032 |
| 4,393,922 | A | | 7/1983 | Baehrle et al. |
| 5,535,711 | A | | 7/1996 | Kach |
| 5,960,861 | A | | 10/1999 | Price et al. |
| 6,058,898 | A | | 5/2000 | Freese, V |
| 7,044,199 | B2 | * | 5/2006 | Thayer .................. H01L 23/473 |
| | | | | 257/E23.098 |
| 7,806,740 | B1 | * | 10/2010 | Taylor ..................... F01P 3/202 |
| | | | | 123/41.1 |
| 11,585,239 | B2 | * | 2/2023 | Gebhard ................. F02C 7/224 |
| 2004/0177827 | A1 | * | 9/2004 | Hoyte ................ F01M 11/0004 |
| | | | | 123/196 AB |
| 2008/0257625 | A1 | * | 10/2008 | Stranges ............. F16H 57/0412 |
| | | | | 180/69.1 |
| 2016/0245134 | A1 | * | 8/2016 | Zahdeh .............. F01M 11/0004 |

FOREIGN PATENT DOCUMENTS

| | | | |
|---|---|---|---|
| DE | 30 02 155 A1 | 9/1981 | |
| DE | 31 42 327 A1 | 5/1983 | |
| DE | 195 00 018 A1 | 1/1996 | |
| DE | 100 34 301 A1 | 1/2002 | |
| DE | 10124071 A1 * | 12/2002 | ......... F01M 11/0004 |
| DE | 10 2011 122 419 A1 | 6/2013 | |
| DE | 10 2015 116 430 A1 | 3/2017 | |
| EP | 1 264 970 B1 | 12/2002 | |
| FR | 738 122 A | 12/1932 | |
| GB | 1043113 | 9/1966 | |
| KR | 10-2004-0091243 A | 10/2004 | |

OTHER PUBLICATIONS

German Search Report issued in German application No. 10 2019 130 291.9 dated Jun. 2, 2020, with Statement of Relevancy (Nine (9) pages).

Chinese-language Chinese Office Action issued in Chinese Application No. 202080063761.5 dated Oct. 28, 2023, with English translation (18 pages).

* cited by examiner

LUBRICANT PAN AND INTERNAL COMBUSTION ENGINE FOR A VEHICLE

BACKGROUND AND SUMMARY OF THE INVENTION

The invention relates to a lubricant pan for a vehicle. The invention furthermore relates to an internal combustion engine for a motor vehicle.

EP 1 264 970 B1 has disclosed an oil pan which, at least in certain regions, is of double-walled design with an inner shell and an outer shell. A temperature-control medium for the inner shell can flow between the inner shell and the outer shell. Furthermore, a heat exchanger is integrated into the oil pan, which heat exchanger exchanges heat between the temperature-control medium and ambient air. No separate heat exchanger is provided for cooling the temperature-control medium.

Furthermore, DE 31 42 327 A1 discloses an oil pan for an internal combustion engine, having a double wall. Between the walls, there is formed a cavity through which a temperature-control medium of the internal combustion engine flows between an inlet and an outlet opening. The walls are formed by an inner shell and an outer shell, wherein the outer shell is connected, with the interposition of an elastic element that insulates body-borne sound, to the inner shell, which is held on the crankcase. An oil pan for an internal combustion engine is also known from U.S. Pat. No. 6,058,898 A.

It is an object of the present invention to create a lubricant pan for a vehicle, and an internal combustion engine for a motor vehicle, such that particularly advantageous cooling of lubricant that is received in the lubricant pan can be realized.

A first aspect of the invention relates to a lubricant pan for a vehicle preferably in the form of a motor vehicle, in particular in the form of a motor car. The lubricant pan has at least one receiving region, also referred to as reservoir, in which a lubricant, in particular a liquid lubricant, can be at least temporarily received. The lubricant is preferably an oil, in particular an engine or transmission oil. For example, a component of the motor vehicle can be lubricated and/or temperature-controlled by means of the lubricant. The component is for example a transmission or else an internal combustion engine, also referred to as combustion motor, for the combustion-powered drive of the motor vehicle.

The lubricant pan has a first wall element, which first wall element at one side at least partially, in particular at least predominantly or entirely, preferably directly delimits the receiving region. Preferably, the first wall element is intrinsically, that is to say considered on its own, formed as a single piece. At the other side, the first wall element preferably directly delimits at least one temperature-control channel which is arranged on a first side, averted from the receiving region, of the wall element and through which a temperature-control medium, in particular a liquid temperature-control medium, can flow. The feature whereby the first wall element preferably directly delimits the receiving region is to be understood in particular to mean that the lubricant that can be or is received in the receiving region makes, or is in, direct contact with the first wall element. Accordingly, the feature whereby the first wall element preferably directly delimits the temperature-control channel can be understood to mean that the temperature-control medium that flows through the temperature-control channel is in, or makes, direct contact with the first wall element.

The temperature-control medium is preferably a fluid, in particular a liquid. The temperature-control medium preferably at least partially, in particular predominantly or exclusively, comprises water, such that the temperature-control medium is for example also referred to as temperature-control water, in particular cooling water. The feature whereby the first wall element, at one side, at least predominantly, in particular entirely, delimits the receiving region can be understood in particular to mean that the first wall element delimits more than half of the receiving region or the entire receiving region.

The lubricant pan furthermore has a second wall element which is at least partially, in particular at least predominantly or entirely, spaced apart from the first wall element. The second wall element preferably directly delimits the temperature-control channel, such that or whereby the temperature-control channel is arranged or runs on a second side, facing toward the first wall element and the receiving region, of the second wall element and between the wall elements. Since the second wall element preferably directly delimits the temperature-control channel, the temperature-control medium flowing through the temperature-control channel preferably makes direct or immediate contact with the second wall element.

The lubricant pan furthermore has at least one first connector, through which, in particular, the temperature-control medium can flow and via which the temperature-control medium can be introduced into the temperature-control channel. In other words, the temperature-control medium can be supplied to the temperature-control channel via the first connector. Furthermore, the lubricant pan has at least one second connector, via which the temperature-control medium can be discharged from the temperature-control channel. This means that the temperature-control medium can flow through the second connector. In a flow direction of the temperature-control medium that flows through the connectors and the temperature-control channel, the first connector is arranged upstream of the temperature-control channel, wherein the first connector is also arranged upstream of the second connector. The temperature-control channel is, in a flow direction of the temperature-control medium that flows through the connectors and the temperature-control channel, arranged downstream of the first connector and upstream of the second connector, and the second connector is, in a flow direction of the temperature-control medium that flows through the connectors and the temperature-control channel, arranged downstream of the temperature-control channel and downstream of the first connector.

In order to prevent undesired mixing of the lubricant from the receiving region with the temperature-control medium flowing through the temperature-control channel, provision is preferably made for the first wall element to be impermeable to the lubricant and to the temperature-control medium. In this way, it is possible in particular to prevent the lubricant from emerging from the lubricant pan in an undesired manner. In order, for example, to prevent the temperature-control medium from emerging from the temperature-control channel in an undesired manner, provision is preferably made for the second wall element to be impermeable at least to the temperature-control medium and preferably also to the lubricant. For example, the respective wall element is not, for example, porous, but is formed as a solid material or from a solid material, such that the respective wall element is impermeable to the lubricant and/or the temperature-control medium.

Preferably, the temperature-control medium and the lubricant differ from one another at least insofar as the lubricant and the temperature-control medium have different viscosities at the same temperature. In particular, provision is preferably made for the lubricant to be more viscous than the temperature-control medium when the lubricant and the temperature-control medium are at the same temperature.

For example, if the lubricant is in the form of an oil, the lubricant pan is for example also referred to as oil pan. The respective wall element may for example be formed by a respective shell or by a respective shell element. Thus, for example, the first wall element is formed by an inner shell, wherein the second wall element is formed for example by an outer shell.

In order to be able to realize particularly advantageous cooling of the lubricant received in the receiving region and thus in the lubricant pan, provision is made according to the invention whereby, in the temperature-control channel between the wall elements, there is arranged a core which is for example formed separately from the wall elements and which is porous and thus permeable to the temperature-control medium, that is to say the temperature-control medium can flow through the core. In other words, the core, by virtue of it being porous, has pores through which the temperature-control medium that flows through the temperature-control channel can flow or flows. The core is thus configured as a porous and preferably intrinsically rigid body, which is preferably non-elastically or non-resiliently deformable. Here, provision is preferably made whereby the temperature-control channel, in particular with regard to its in particular total volume, is at least partially, in particular at least predominantly or entirely, filled with the core. In particular, provision is preferably made whereby at least 60 percent, in particular at least 70 percent or at least 80 percent or at least 90 percent of the temperature-control channel or of the volume of the temperature-control channel are filled with the core. A particularly advantageous exchange of heat between the wall elements can be realized through the use of the core. In particular, it is particularly advantageously possible for heat to be transferred from the first wall element to the core and from the core to the second wall element and to the temperature-control medium flowing through the temperature-control channel, such that, for example, heat can be particularly advantageously transferred from the first wall element, and via the first wall element from the lubricant received in the receiving region, to the core, and from the core to the second wall element and to the temperature-control medium flowing through the temperature-control channel. In this way, the lubricant received in the receiving region can be cooled in a particularly effective and efficient manner, in particular without a further heat exchanger, which is external with respect to the lubricant pan, for the temperature control, that is to say cooling and/or warming, of the lubricant being provided or necessary for this purpose.

It is furthermore possible that heat is particularly advantageously transferred from the temperature-control medium flowing through the temperature-control channel to the second wall element, from the second wall element to the core, from the core to the first wall element, and from the first wall element to the lubricant, whereby the lubricant received in the receiving region can be warmed in a particularly effective and efficient manner. Here, the knowledge on which the invention is based is that, for advantageous operation, internal combustion engines require a lubricating medium that reaches its advantageous viscosity at relatively high temperatures. If the vehicle is shut down, the oil temperature falls after a period of time. Upon a restart, the oil is not at the optimum temperature. In the present invention, it is therefore also conceivable for heat to be transferred from the oil pan to the lubricant. For this purpose, for example, the reservoir is of particularly insulating construction, and/or a previously temperature-controlled fluid, in particular in the form of the temperature-control medium, is conducted through the porous oil pan. If the temperature-control channel and the temperature-control medium are for example utilized to cool the lubricant, then the temperature-control channel functions as a cooling channel, and the temperature-control medium functions as a coolant.

In the fully manufactured state of the vehicle, the latter has, for example, a lubricant circuit through which the lubricant can flow and which is for example also referred to as oil circuit. Since it is now particularly advantageously possible by means of the lubricant pan according to the invention for the lubricant received in the receiving region to be temperature-controlled, that is to say cooled and/or warmed, in a particularly advantageous manner, it is for example possible for the lubricant circuit to have no heat exchanger, external with respect to the oil pan and provided in addition to the oil pan, for cooling the lubricant, such that the number of parts, the weight and costs can be kept particularly low. At the same time, the lubricant can be temperature-controlled in a particularly advantageous manner.

Since, furthermore, the temperature-control medium that flows through the temperature-control channel can preferably make direct contact with the core and/or the first wall element and/or the second wall element, a particularly advantageous transfer of heat from the respective wall element or from the core to the temperature-control medium or vice versa is possible, such that a particularly advantageous dissipation of heat and/or a particularly advantageous introduction of heat into the lubricant can be realized.

In order allow temperature control of the lubricant in a particularly advantageous and weight-optimized manner, it is provided in one refinement of the invention that the wall elements are in each case formed from a metallic material, in particular from a light metal and preferably from aluminum, or from a plastic. In this way, a particularly advantageous exchange of heat can be ensured. The plastic is preferably a plastic, in particular a special plastic, with thermally conductive properties. The thermally conductive plastic may for example comprise boron nitride in order to be able to realize particularly advantageous thermal conductivity.

Altogether, it is evident that, by virtue of the fact that the temperature-control medium can flow through the temperature-control channel and the temperature-control medium runs through between the wall elements, the lubricant pan is configured as a lubricant pan with media-based cooling or media-based temperature control or oil pan with media-based temperature control. Particularly effective temperature control of the lubricant is possible by means of the lubricant pan with media-based temperature control.

A further embodiment is distinguished by the fact that the wall elements are formed as a single piece with one another, that is to say by a single-piece structural element. In this way, the number of parts can be kept particularly low, wherein particularly advantageous temperature control of the lubricant is possible. The wall elements or the structural element are or is for example produced by casting, that is to say formed as cast components or as a cast component. Here, it is in particular conceivable that, during the course of the casting, the core is used as an in particular lost casting core which, during the casting, is for example encapsulated by a melt from which the wall regions are produced. In this way, the lubricant pan according to the invention can be produced in a particularly simple and inexpensive manner and can ensure particularly advantageous cooling of the lubricant.

It has been found to be particularly advantageous if at least one of the wall elements, both wall elements, is or are formed as a single piece with the core. Alternatively or in addition, it is conceivable for the core to be formed as a single piece. The wall elements and the porous core are particularly preferably formed as a single piece with one another, that is to say produced from one material in one production process. Thus, for example, the wall elements and the porous core are formed by a single-piece structural element. In one particularly advantageous embodiment of the invention, the core is formed from a metallic material, in particular from a light metal and preferably from aluminum, or from a plastic. The statements made in this regard relating to the wall elements can be readily transferred to the core and vice versa. In this way, it is possible to realize a particularly advantageous exchange of heat between the core and the respective wall element and/or between the core and the temperature-control medium, such that advantageous cooling of the lubricant can be realized.

It is however basically conceivable for the first wall element and/or the second wall element and/or the core to be formed from a plastic. In this way, too, the weight can be kept particularly low, and a particularly advantageous exchange of heat can be ensured.

In a further refinement of the invention, provision is made for the core and the respective wall element to be formed from mutually different materials. In other words, it is conceivable for the core to be formed from a first material, for the first wall element to be formed from a second material, and for the second wall element to be formed from a third material. The second material and the third material can be identical materials or mutually different materials. The first material and the second material are for example mutually different materials, and/or the first and the third material are for example mutually different materials. The respective material may be the respective abovementioned metal material or the abovementioned plastic. Particularly advantageous cooling, and at the same time advantageous mechanical properties of the lubricant pan, can be ensured in this way.

In a further refinement of the invention, in order to allow particularly advantageous temperature control of the lubricant by means of the lubricant pan, provision is made whereby, in the temperature-control channel, there is arranged at least one partition element which is impermeable to the temperature-control medium and which is in particular formed from solid material and which serves for diverting the temperature-control medium flowing through the temperature-control channel. In this way, it is for example possible to realize a particularly long path along which the temperature-control medium flowing through the temperature-control channel flows. Furthermore, the temperature-control medium can be directed or guided in accordance with demand in order to realize advantageous cooling.

Here, it has proven to be particularly advantageous if the partition element is formed as a single piece with the core. In other words, provision is preferably made for the partition element to be formed by the core. A particularly advantageous exchange of heat can thus be realized. In particular, in this embodiment, provision may be made for the core to have at least one first subregion, which is porous and accordingly has the abovementioned pores through which the temperature-control medium can flow. Furthermore, for example, the core has at least one second subregion which is formed as a single piece with the first subregion and which in particular directly adjoins the first subregion and which is of non-porous form and which accordingly has no pores. In other words, the second core is formed from solid material and is accordingly impermeable to the temperature-control medium. Here, for example, the second subregion forms the abovementioned partition element. In this way, particularly advantageous guidance of the temperature-control medium can be realized in a simple manner. Consequently, temperature control of the lubricant is possible in a particularly advantageous manner by means of the lubricant pan.

In a further embodiment of the invention, in order to be able to particularly advantageously discharge heat from the lubricant and in particular from the lubricant pan and supply the heat to the lubricant, provision is made for cooling fins to be arranged on the second wall element on an outer side, which is averted from the first wall element and from the receiving region, of the second wall element. The cooling fins are preferably formed as a single piece with the second wall element. For example, during travel, in particular during forward travel, of the vehicle, relative wind resulting from the traveling movement can, in particular directly, impinge on and flow around the cooling fins, such that a particularly advantageous transfer of heat from the second wall element via the cooling fins to the relative wind is possible. Particularly effective and efficient temperature control of the lubricant pan, and via the latter the lubricant, is consequently possible.

It is furthermore conceivable that the lubricant pan may have different material zones. This means that material zones of the lubricant pan may be formed from different materials, such that, for example, a first of the material zones is formed from a first material, for example from plastic, and a second of the material zones is formed from a second material that differs from the first material, for example from a metallic material.

The respective connector, also referred to as connector element, may for example be formed as a single piece with at least one of the wall elements and/or with the core, that is to say for example as a single piece with the structural element, or the connector is formed separately from the structural element, that is to say separately from the wall elements and separately from the core and is at least indirectly mechanically connected to the wall elements and to the core. The temperature-control medium can flow through the respective connector, such that the temperature-control medium can be introduced into the temperature-control channel, and can be discharged from the temperature-control channel, via the connector.

For example, a line element which is formed separately from the respective connector and through which the temperature-control medium can flow can be connected to the respective connector, in particular without the use of tools and/or by means of a quick-action fastener, in order to guide the temperature-control medium in a defined manner.

A second aspect of the invention relates to an internal combustion engine, also referred to as combustion machine or combustion motor, for a motor vehicle. The internal combustion engine has at least one lubricating point that is to be lubricated and/or temperature-controlled by means of a lubricant. Furthermore, the internal combustion engine has a lubricant pan, in particular a lubricant pan according to the invention according to the first aspect of the invention. The lubricant pan has at least one receiving region in which the lubricant can be at least temporarily received. The lubricant pan furthermore has a first wall element, which first wall element at one side at least partially and preferably directly delimits the receiving region and at the other side preferably directly delimits at least one temperature-control channel which is arranged on a first side, averted from the receiving region, of the first wall element and through which a temperature-control medium can flow. The lubricant pan furthermore has a second wall element, which second wall element is spaced apart from the first wall element and preferably directly delimits the temperature-control channel which is arranged on a second side, facing toward the first wall element and the receiving region, of the second wall element and which is arranged between the wall elements. The lubricant pan furthermore comprises at least one first connector, via which the temperature-control medium can be introduced into the temperature-control channel. The lubricant pan furthermore has at least one second connector, via which the temperature-control medium can be discharged from the temperature-control channel. Preferably, the second connector is spaced apart from the first connector. The connectors are for example arranged on mutually averted sides, or on opposite sides, of the lubricant pan.

In order to now allow particularly advantageous temperature control, that is to say warming and/or cooling, of the lubricant arranged in the receiving region, it is also provided in the case of the second aspect of the invention that, in the temperature-control channel between the wall elements, there is arranged a core which is for example formed separately from the wall elements or as a single piece with the wall elements and which is porous and thus permeable to the temperature-control medium. Advantages and advantageous refinements of the first aspect of the invention are to be regarded as advantages and advantageous refinements of the second aspect of the invention, and vice versa.

In one advantageous refinement of the invention, in order to allow particularly effective and efficient temperature control of the lubricant via the lubricant pan, provision is made for the internal combustion engine to have a temperature-control medium circuit through which the temperature-control medium can flow and in which the temperature-control channel of the lubricant pan and thus the lubricant pan is arranged. The lubricant pan is thus a lubricant pan, in particular oil pan, with media-based temperature control, by means of which effective and efficient temperature control of the lubricant arranged in the receiving region is possible.

For example, in the temperature-control medium circuit, there is arranged a pump by means of which the temperature-control medium can be conveyed through the temperature-control medium circuit and thus through the temperature-control channel. Alternatively or in addition, at least one or exactly one heat exchanger, which is provided in addition to the lubricant pan and which is external with respect to the lubricant pan, is arranged in the temperature-control medium circuit, through which heat exchanger, for example, the temperature-control medium can flow. For example, a further medium can flow around and/or through the heat exchanger. By means of the heat exchanger, a heat transfer from the temperature-control medium to the medium and/or vice versa is possible, whereby the temperature-control medium is temperature-controlled by means of the heat exchanger using the medium. The medium is preferably a gas or a liquid which may at least partially, in particular predominantly or entirely, comprise water. For example, the medium is the abovementioned relative wind which, for example during travel, in particular forward travel, of the motor vehicle, can flow through and/or around the heat exchanger.

Further details of the invention will emerge from the following description of a preferred exemplary embodiment with the associated drawings.

DETAILED DESCRIPTION OF THE DRAWINGS

In the figures, identical or functionally identical elements are provided with the same reference designations.

Figure 1:
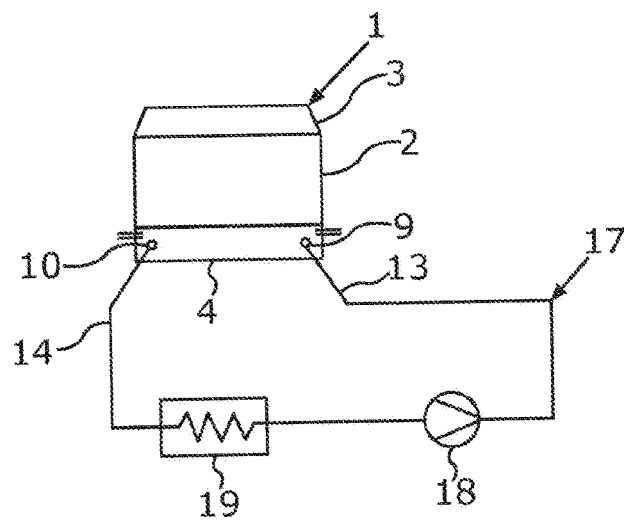
FIG. 1 shows a schematic front view of an internal combustion engine according to the invention for a motor vehicle.

FIG. 1 shows, in a schematic front view, an internal combustion engine 1, also referred to as combustion machine or combustion motor, for a motor vehicle, which is preferably in the form of a motor car, in particular a passenger motor car. This means that the motor vehicle, in its fully manufactured state, has the internal combustion engine 1 and can be driven in, in particular purely, combustion-powered fashion by means of the internal combustion engine 1. The motor vehicle is for example in the form of a hybrid vehicle or else a motor vehicle that can be driven in purely combustion-powered fashion. The internal combustion engine 1 has a housing element 2, which is for example configured as a crankcase, in particular as a cylinder crankcase. The housing element 2 has, for example, at least one cylinder in which a piston of the internal combustion engine 1 is received so as to be movable in translational fashion. The piston is for example articulatedly connected via a connecting rod to an output shaft, which is in particular configured as a crankshaft, of the internal combustion engine 1, whereby translational movements of the piston in the cylinder can be converted into a rotational movement of the output shaft. The output shaft can thus rotate about an axis of rotation relative to the housing element 2. The connecting rod is for example articulatedly or rotatably coupled to the piston, and mounted on the output shaft, at respective bearing points. Alternatively or in addition, the output shaft is mounted rotatably on the housing element 2 at respective bearing points.

The internal combustion engine 1 furthermore has at least one further housing element 3 which is formed separately from the housing element 2 and which is connected at least indirectly, in particular directly, to the housing element 2 and which is for example configured as a cylinder head of the internal combustion engine 1. The internal combustion engine 1 has at least one or preferably multiple lubricating points to which a lubricant, which for example is configured as an oil and/or is in liquid form, can be supplied during operation of the internal combustion engine 1. In this way, the respective lubricating point is temperature-controlled and/or lubricated. For example, the abovementioned bearing points are respective lubricating points to which the lubricant is supplied during the operation of the internal combustion engine 1. In particular, at least one structural element of the internal combustion engine 1 is temperature-controlled and/or lubricated by means of the lubricant during the operation of the internal combustion engine 1. The structural element is for example the housing element 2, the piston, the connecting rod and/or the output shaft.

Here, the internal combustion engine 1 has a lubricant circuit which is not illustrated in any more detail in the figures and through which the lubricant can flow and which, in particular if the lubricant is an oil, is also referred to as oil circuit. Here, the respective lubricating point is arranged in the lubricant circuit, and the lubricant can be supplied to the respective lubricating point via the lubricant circuit.

Figure 2:
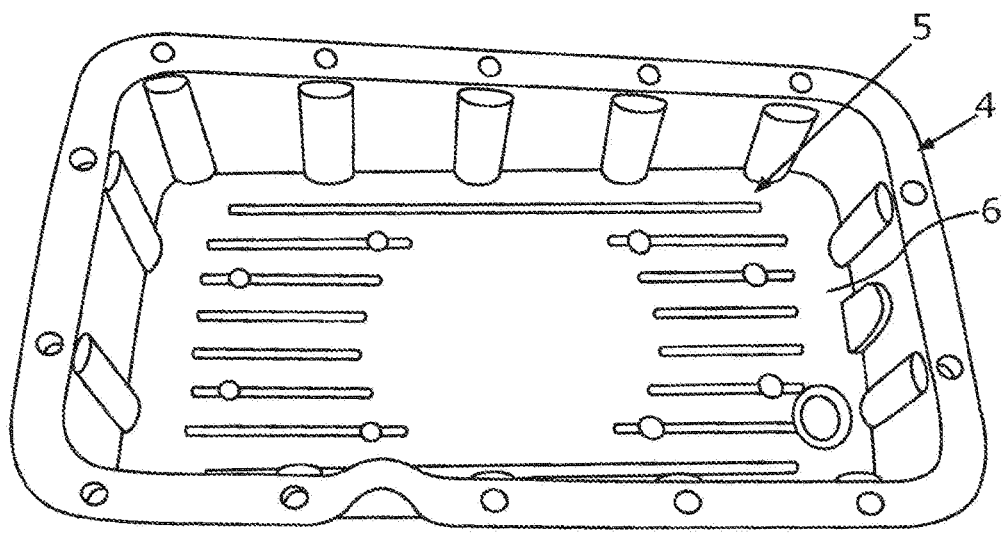
FIG. 2 shows a schematic and perspective plan view of a lubricant pan of the internal combustion engine.
Figure 3:
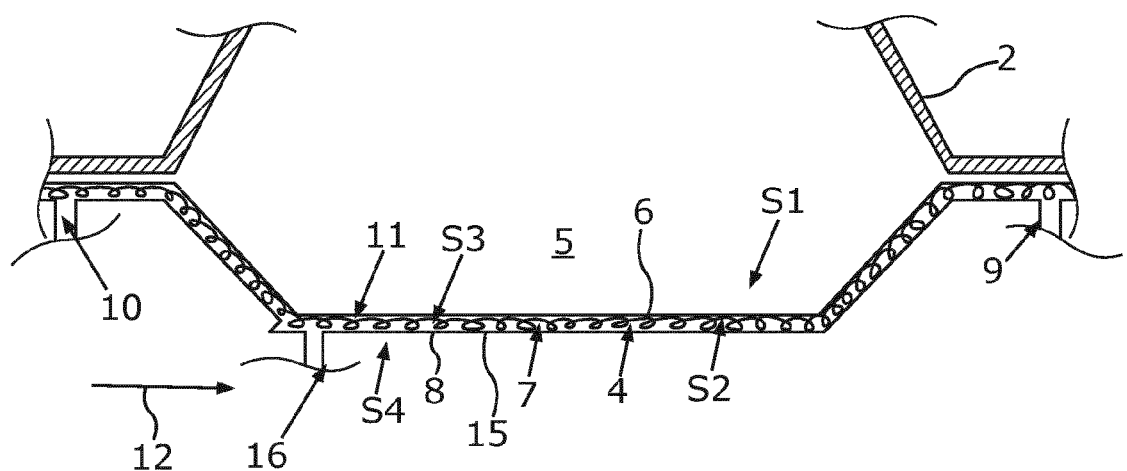
FIG. 3 shows a schematic sectional view of a detail of the lubricant pan.

When viewed together with FIGS. 2 and 3, it can be seen particularly clearly that the internal combustion engine 1 also has a lubricant pan 4, also referred to as oil pan, which is for example formed separately from the housing element 2 and connected at least indirectly, in particular directly, to the housing element 2. The lubricant pan 4 is for example arranged underneath the housing element 2 in a vehicle vertical direction. Furthermore, the lubricant pan 4, in particular a receiving region 5 of the lubricant pan 4, is arranged in the lubricant circuit. Here, the lubricant can be at least temporarily received in the receiving region 5. During operation, it is for example the case that the lubricant—after having performed lubrication and/or temperature control of the lubricating point—flows from the lubricating point to and in particular into the receiving region 5, in particular purely under the force of gravity. In other words, the lubricant flows, in particular purely, under the force of gravity from the lubricating point to and into the receiving region 5, and is then at least temporarily received in the receiving region 5. The lubricant received in the receiving region 5 is thereupon, for example, conveyed out of the receiving region 5 and back to the lubricating point by means of a pump.

The lubricant pan 4 has the receiving region 5 and also a first wall element 6, which, at one side, at least partially, in particular at least predominantly or entirely, directly delimits the receiving region 5. In the exemplary embodiment shown in the figure, the first wall element 6 is intrinsically formed as a single piece, wherein the wall element 6 delimits the entire receiving region 5. For example, the wall element 6 is configured as a first shell element and, here, as an inner shell of the lubricating pan 4. The receiving region 5 is in this case arranged on a first side S1, facing toward the receiving region 5 and in particular toward the housing element 2 and also referred to as inner side, of the wall element 6. At the other side, the first wall element 6 directly delimits at least one temperature-control channel 7 of the lubricating pan 4, which at least one temperature-control channel 7 is arranged on a second side S2, averted from the receiving region 5 and thus from the housing element 2 and from the first side S1, of the first wall element 6, and through which at least one temperature-control channel 7 a preferably liquid temperature-control medium can flow. Since the first wall element 6 in each case directly delimits, at one side, the receiving region 5 and, at the other side, the temperature-control channel 7, the lubricant that is or can be received in the receiving region 5 can also make direct contact with the wall element 6, also referred to as first wall region, in particular the first side S1 thereof. Furthermore, the temperature-control medium flowing through the temperature-control channel 7 can make direct contact with the wall element 6, in particular the second side S2 thereof. A particularly advantageous transfer of heat from the lubricant received in the receiving region 5 to the wall element 6, and from the wall element 6 to the temperature-control medium flowing through the temperature-control channel 7, or vice versa, is consequently possible.

The lubricant pan 4 furthermore has a second wall element 8 which is at least partially, in particular at least predominantly or entirely, spaced apart from the first wall element 6 and which may for example be configured as a second shell or as a second shell element. In particular, the second wall element 8 may be an outer shell. The shell elements may be formed as a single piece with one another, or the shell elements are components which are formed separately from one another and which are for example at least indirectly, in particular directly, connected to one another. The second wall element 8 directly delimits the temperature-control channel 7, which is arranged on a third side S3, facing toward the first wall element 6 and the receiving region 5, of the wall element 8, such that the temperature-control channel 7 is arranged between the wall elements 6 and 8, also referred to as wall regions, in particular between the sides S2 and S3. Since the wall element 8 directly delimits the temperature-control channel 7, the temperature-control medium that flows through the temperature-control channel 7 makes direct or immediate contact with the wall element 8, in particular the side S3 of the wall element 8.

The lubricant pan 4 furthermore has a first connector 9, also referred to as inlet, through which the temperature-control medium can flow. The temperature-control medium can be introduced into the temperature-control channel 7 via the connector 9. The lubricant pan 4 furthermore has a second connector 10, which is spaced apart from the first connector 9 and which is provided in addition to the first connector 9 and through which the temperature-control medium can flow and via which the temperature-control medium—after having flowed through the temperature-control channel 7—can be conducted out of, or discharged from, the temperature-control channel 7.

In order to now allow particularly effective and efficient temperature control of the lubricant received in the receiving region 5, a core 11 is arranged in the temperature-control channel 7 between the wall elements 6 and 8, which core 11 is for example formed separately from the wall elements 6 and 8. It is furthermore conceivable for the core 11 to be formed as a single piece with the wall elements 6 and 8. The core 11 is porous and thus permeable to the temperature-control medium. In other words, the core 11 is porous, whereby the core 11 has pores through which the temperature-control medium can flow, or flows, on its path from the connector 9 to the connector 10. Since the core 11 is arranged in the temperature-control channel 7 and is porous, contact between the core 11 and the temperature-control medium flowing through the temperature-control channel 7 can be realized over a particularly large area. A particularly advantageous transfer of heat can consequently take place from the core 11 to the temperature-control medium flowing through the temperature-control channel 7, or vice versa. Furthermore, heat can particularly advantageously be transferred from the wall element 6 to the core 11 or vice versa, which core 11 preferably makes direct contact with the wall element 6, in particular the side S2 thereof. Alternatively or in addition, the core makes contact, for example, with the wall element 8, in particular the side S3 thereof.

During travel, in particular during forward travel, of the motor vehicle, it is for example the case that relative wind is generated, which is illustrated in FIG. 3 by an arrow 12. The relative wind can directly impinge on and flow around, that is to say make contact with, a side S4 of the wall element 8, which side S4 is averted from the wall element 6 and for example points downward in a vehicle vertical direction and is also referred to as outer side. It is thus possible, for example, for heat to be particularly advantageously transferred from the lubricant received in the receiving region 5 to the wall element 8 via the wall element 6 and the core 11, and from the wall element 8 to the relative wind that makes direct contact with the wall element 8, or vice versa, whereby the lubricant received in the receiving region 5 can be temperature-controlled, that is to say cooled or warmed, in a particularly effective and efficient manner.

Preferably, the wall elements 6 and 8 are each formed from a metallic material, in particular from a light metal and preferably from aluminum. Alternatively or in addition, the core 11 is formed from a metallic material, in particular from light metal and preferably from aluminum. It is alternatively conceivable for the wall element 6 and/or the wall element 8 and/or the core 11 to be formed from a plastic. At least one of the wall elements 6 and 8 and/or the core 11 may in this case be formed from a metallic material.

Overall, it can be seen that a layered construction, in particular a sandwich construction, of the lubricant pan 4 is provided. In this layered construction, the wall elements 6 and 8 are respective outer plies or outer layers, between which the core 11 is arranged. Since the core 11 is porous and is consequently permeable to the temperature-control medium, the core 11 is a media-permeable core. The outer layers, also referred to as edge layers, are formed from solid material and are thus impervious, that is to say impermeable, to the temperature-control medium and to the lubricant.

To the connector 9, there is for example connected a first line, through which the temperature-control medium can flow and which is formed separately from the lubricant pan 4 and via which the temperature-control medium can be introduced into the connector 9 and into the temperature-control channel 7. Furthermore, for example, a second line is provided which is formed separately from the lubricant pan 4 and through which the temperature-control medium can flow and which can be connected to the connector 10. Consequently, the temperature-control medium flowing through the temperature-control channel 7 can be conducted out of the temperature-control channel 7, and introduced into the second line, via the connector 10. The first line can for example be seen from FIG. 1 and is denoted there by 13. The second line can for example likewise be seen in FIG. 1 and is denoted there by 14.

It can be seen from FIG. 3 that, in the temperature-control channel 7, there may be arranged at least one non-porous partition element 15, which is impermeable to the temperature-control medium and which is for example configured as a partition wall. By means of the partition wall, the temperature-control medium flowing through the temperature-control channel 7 can be diverted as required in order to generate an advantageous flow of the temperature-control medium. The partition element 15 is for example formed as a single piece with the core 11 or by the core.

In order to realize a particularly advantageous transfer of heat from the wall element 8 to the relative wind, cooling fins 16 are preferably arranged on the second wall element 8 on the side S4, which is averted from the first wall element 6 and from the receiving region 5, of the second wall element 8, and the relative wind can directly impinge on and flow around the cooling fins 16. The cooling fins 16 may be formed separately from the wall element 8 and fastened to the wall element 8, in particular cohesively, for example by welding. It is alternatively conceivable for the cooling fins 16 to be formed as a single piece with the wall element 8.

It can be seen particularly clearly from FIG. 1 that the internal combustion engine 1 has a temperature-control medium circuit 17 through which the temperature-control medium can flow. The lines 13 and 14 and the temperature-control channel 7, which is fluidically connected to the lines 13 and 14, are arranged in the temperature-control medium circuit 17. The temperature-control medium can flow through the temperature-control medium circuit 17 and thus the lines 13 and 14 and the temperature-control channel 7. Here, a preferably electrically operable pump 18 is arranged in the temperature-control medium circuit 17, by means of which pump 18 the temperature-control medium can be conveyed through the temperature-control medium circuit 17 and thus in particular through the temperature-control channel 7. It is furthermore preferably the case that at least or exactly one heat exchanger 19, which is provided in addition to the lubricant pan 4 and is external with respect to the lubricant pan 4 and through which the temperature-control medium can flow, is arranged in the temperature-control medium circuit 17, also referred to simply as temperature-control circuit. It is furthermore possible, for example, for a medium to flow around and/or through the heat exchanger 19. By means of the heat exchanger 19, a transfer of heat can take place from the temperature-control medium flowing through the heat exchanger 19 to the medium, whereby temperature control of the temperature-control medium is implemented. The medium is for example the abovementioned relative wind. In a flow direction of the temperature-control medium flowing through the temperature-control circuit 17, it is for example the case that the heat exchanger 19 is arranged downstream of the temperature-control channel 7 and upstream of the pump 18 or downstream of the pump 18 and upstream of the temperature-control channel 7. In particular, the heat exchanger 19 is arranged outside the lubricant pan 4.

Since particularly effective and efficient temperature control of the lubricant is possible by means of the lubricant pan 4, it is for example possible for the abovementioned lubricant circuit to have no cooler, provided in addition to the lubricant pan 4, for cooling the lubricant. In this way, the number of parts and thus the weight and costs can be kept particularly low. The connector 10 is for example a return or outlet, because the temperature-control medium can be discharged from the temperature-control channel 7 via the connector 10. The connectors 9 and 10 are preferably arranged in a flow-optimized manner in order to be able to realize an advantageous flow of the temperature-control medium and to be able to realize a particularly intense cooling action. The partition element 15, also configured as a partition, is formed for example by a local solid material in the core 11. The cooling fins 16 ensure contact with the relative wind over a particularly large area, such that effective and efficient cooling can be realized.

The core 11 is for example an open-pore cast component, which may be formed in particular from aluminum. It is thus possible, for example, for the core 11 to be formed preferably as an open-pore aluminum cast part and thus by an open-pore aluminum casting. Such an open-pore aluminum cast part may be produced for example by an open-pore aluminum casting process, in particular by an open-pore aluminum permanent mold casting process, in particular using salt for the mold filling, and/or may have a density of 1.3 grams per cubic centimeter. The abovementioned pores have for example a pore size that lies in a range from 0.14 to 0.63 millimeters inclusive. In particular, the pore size is the largest diameter, in particular the largest inner diameter, of the respective pores.

LIST OF REFERENCE CHARACTERS

1 Internal combustion engine
2 Housing element
3 Housing element

4 Lubricant pan
5 Receiving region
6 First wall element
7 Temperature-control channel
8 Second wall element
9 First connector
10 Second connector
11 Core
12 Arrow
13 First line
14 Second line
15 Partition element
16 Cooling fins
17 Temperature-control medium circuit
18 Pump
19 Heat exchanger
S1 First side
S2 Second side
S3 Third side
S4 Fourth side

What is claimed is:

1. A lubricant pan of a vehicle, comprising:
a receiving region in which a lubricant is at least temporarily receivable;
a first wall element, wherein a first side of the first wall element at least partially delimits the receiving region, wherein a second side of the first wall element delimits a temperature-control channel, wherein the temperature-control channel is disposed on the second side of the first wall element, and wherein the second side of the first wall element is averted from the receiving region;
a second wall element, wherein the second wall element is at least partially spaced apart from the first wall element and delimits the temperature-control channel and wherein the temperature-control channel is disposed on a side of the second wall element that faces toward the first wall element and the receiving region;
wherein the temperature-control channel is disposed between the first wall element and the second wall element and wherein a temperature-control medium is flowable through the temperature-control channel;
a first connector, wherein the temperature-control medium is introducible into the temperature-control channel via the first connector;
a second connector, wherein the temperature-control medium is dischargeable from the temperature-control channel via the second connector;
a core, wherein the core is formed as a single piece, wherein the core is disposed in the temperature-control channel, and wherein the core has pores through which the temperature-control medium is flowable;
wherein the core has a first subregion which has the pores through which the temperature-control medium is flowable, wherein the first subregion is a porous and intrinsically rigid body, and wherein the core has a second subregion, wherein the second subregion is formed from a solid material, has no pores, and is impermeable to the temperature-control medium;
wherein the first wall element and the second wall element form a first horizontal portion of the lubricant pan, wherein the first horizontal portion of the lubricant pan is disposed parallel to, and adjacent to, a first horizontal portion of a housing element of an internal combustion engine of the vehicle, wherein the temperature-control channel with the core is disposed within the first horizontal portion of the lubricant pan, wherein the first connector is disposed on the first horizontal portion of the lubricant pan, and wherein the temperature-control medium is flowable from the first connector into and through the temperature-control channel disposed within the first horizontal portion of the lubricant pan;
wherein the first wall element and the second wall element form a second horizontal portion of the lubricant pan, wherein the second horizontal portion of the lubricant pan is disposed parallel to, and adjacent to, a second horizontal portion of the housing element of the internal combustion engine of the vehicle, wherein the temperature-control channel with the core is disposed within the second horizontal portion of the lubricant pan, wherein the second connector is disposed on the second horizontal portion of the lubricant pan, and wherein the temperature-control medium is flowable through the temperature-control channel disposed within the second horizontal portion of the lubricant pan and into the second connector from the second horizontal portion of the lubricant pan.

2. The lubricant pan according to claim 1, wherein the first wall element and the second wall element are each formed from a metallic material or from a plastic.

3. The lubricant pan according to claim 1, wherein the first wall element and the second wall element are formed as a single piece with one another.

4. The lubricant pan according to claim 1, wherein at least one of the first wall element and the second wall element is formed as a single piece with the core.

5. The lubricant pan according to claim 1, wherein the core is formed from a metallic material or from a plastic.

6. The lubricant pan according to claim 1, wherein the core and at least one of the first wall element and the second wall element are formed from different materials.

7. The lubricant pan according to claim 1, further comprising cooling fins disposed on the second wall element on an outer side of the second wall element which is averted from the first wall element and from the receiving region.

8. The lubricant pan according to claim 1, wherein the lubricant pan has at least one first material zone which is formed from a first material and at least one second material zone which is formed from a second material that differs from the first material.

9. An internal combustion engine for a motor vehicle, comprising:
a lubricating point that is to be lubricated and/or temperature-controlled by a lubricant; and
the lubricant pan according to claim 1.

10. The internal combustion engine according to claim 9, further comprising a temperature-control medium circuit, wherein the temperature-control medium is flowable through the temperature-control medium circuit and wherein the temperature-control channel of the lubricant pan is disposed in the temperature-control medium circuit.

* * * * *